May 13, 1930.  G. E. MISSMAN  1,758,052
BASKET LIDDING TOOL
Filed May 31, 1927    2 Sheets-Sheet 1
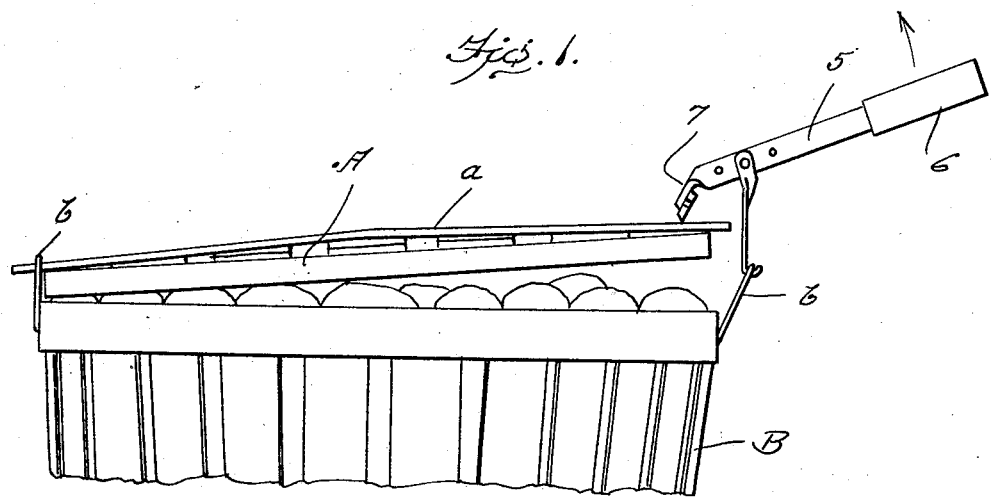
Fig. 1.
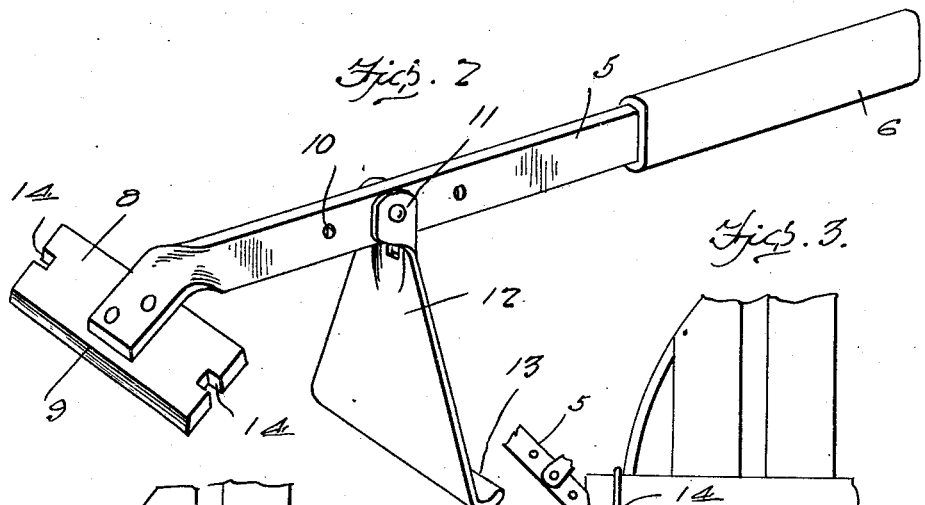
Fig. 2.
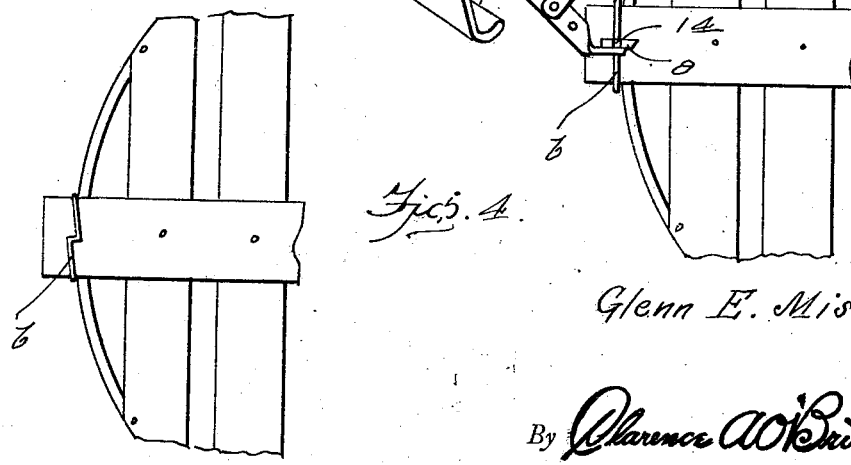
Fig. 3.
Fig. 4.
Inventor
Glenn E. Missman
By Clarence A. O'Brien
Attorney

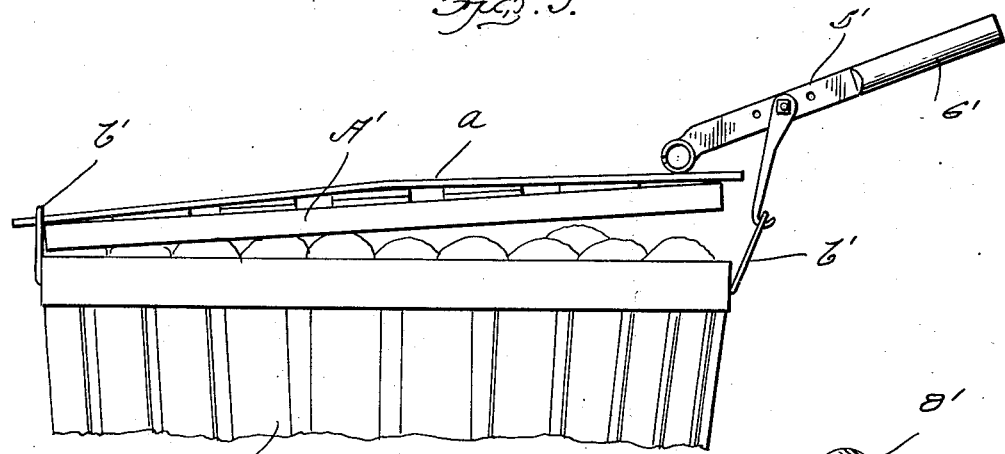
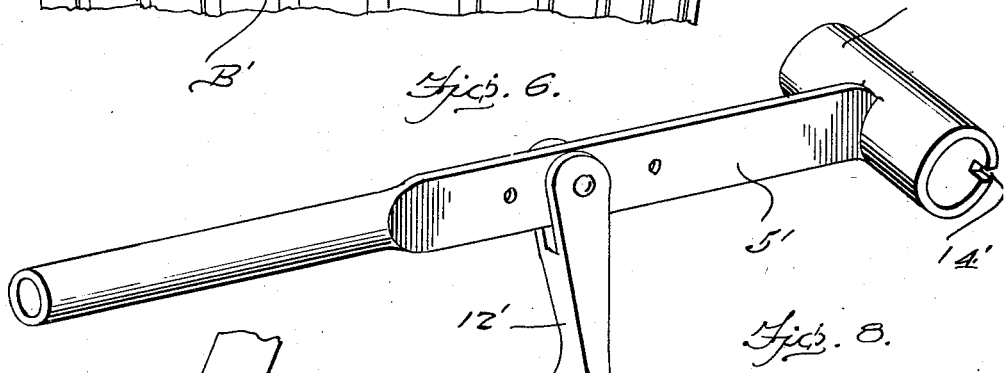
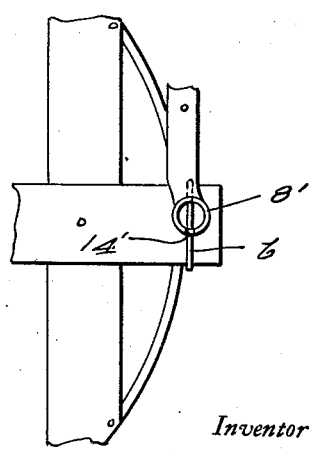

Patented May 13, 1930

1,758,052

UNITED STATES PATENT OFFICE

GLENN E. MISSMAN, OF COUNCIL, IDAHO

BASKET-LIDDING TOOL

Application filed May 31, 1927. Serial No. 195,316.

This invention relates to new and useful improvements in tools adapted for use in the application of the lids of fruit baskets after the same have been packed, the invention aiming to provide a highly novel, simple and efficient tool, whereby after the lid is attached at one point to the basket, the same may be forced down into engagement with the basket, by applying force to the lid, at a point opposed to the first point of attachment, so that the adjacent end of the usual cross slat of the lid may be engaged beneath its bail and then affixed thereto.

In carrying out the present invention, there is provided a tool equipped to provide a hand lever and having means at one end for engaging the basket lid slat, and further having means for engagement with the usual wire bail adjacent that end of the slat, so that a rocking of the tool in a certain direction will force the lid downwardly and at the same time bend the bail into engagement over the adjacent end of the lid slat.

Further, the tool is so constructed as to permit the usual slat engaging bails to be crimped so that the same will tightly bear against the slat, at the opposite ends thereof to prevent disengagement of the bails with respect to the slat.

In the drawings, wherein there is disclosed but two embodiments of the present invention, Figure 1 is a fragmentary side elevation of a packed conventionally constructed basket, the lid thereof being forced into closed position through the use of one form of the tool, which is disclosed in side elevation.

Figure 2 is a perspective of this form of tool.

Figure 3 is a fragmentary top plan view of a lidded basket and disclosing fragmentarily in top plan, this form of tool, which in this instance is being used as a means to crimp the slat engaging bail.

Figure 4 is a similar view disclosing the bail as having been crimped.

Figure 5 is a view similar to Figure 1, disclosing a modified form of construction.

Figure 6 is a perspective of this particular form of the invention.

Figure 7 is a fragmentary side elevation of the basket, and a fragmentary side elevation of this form of tool disclosed in position after the lid has been forced downwardly into engagement with the basket and the bail swung over into position upon the slat, and Figure 8 is a view similar to Figure 3, disclosing this form of tool as being used for the purpose of crimping one of the slat bails so that the same will bind against the slat.

First, having reference to Figures 1 to 4 inclusive, my novel tool consists of a flat bar 5, equipped at its outer end with a suitable handle 6, the inner end thereof being bent downwardly and twisted to provide an attaching lug 7. Disposed upon the bottom face of this lug is a cross plate 8 riveted or otherwise fixedly secured to the lug, as indicated in Figure 2. The outer edge of this plate is sharpened as at 9, so that the same will bite into the slat $a$ of a conventional basket lid A when the same is being forced into engagement with the basket B, this plate obviously functioning as a fulcrum for the lever 5.

Intermediate the ends of the lever 5, the same is formed with spaced openings 10, while pivoted to the lever at any predetermined one of the openings is the bifurcated and eared end 11 of a depending plate 12, which is of gradually increasing width toward its lower end, while the lower edge thereof is bent rearwardly and upwardly to provide a bail engaging hook 13.

In actual practice, one end of the basket lid slat $a$ is engaged under one of the basket bails $b$, $b$. The hook 13 of the pivoted tool plate 12 is then engaged with the opposite bail $b$, after which the plate 8 of the tool is disposed upon the said slat *a*. The tool is then forced upwardly in the direction of the arrow, Figure 1, for consequently forcing the lid in a downward direction. By reason of the plate 12 having hooked engagement with the adjacent bail *b*, such an action of the tool will cause the bail to swing inwardly upon the adjacent end of the lid slat *a*, to secure this end of the slat to the basket.

The opposite ends of the plate 8 are notched as at 14—14 and after the ends of the lid slat *a* have been engaged through the bails *b*, *b*, the top portions of these bails are crimped as indicated in Figure 4, by applying either notched end of the plate 8 thereto, and then turning upon the lever 5, as generally suggested in Figure 3.

In the form of the invention disclosed in Figures 5 to 8 inclusive, the tool also consists of a flat hand lever 5', the outer end of which is of rounded contour to provide a handle 6'. Formed upon the inner end of this lever is a slightly depending and transversely extending hollow tube 8', to form a fulcrum point for this end of the lever. Adjustably and pivotally secured to the lever 5', is a depending member 12', the lower end of which is widened and bent reversely and upwardly to provide a hook 13', for engagement with the bails *b'*, *b'*, of the basket B' disclosed in Figures 5, 7 and 8.

The opposite ends of the tube 8' are notched, at its forward side, as at 14', so that this form of tool may also be employed to crimp the bails *b'*, *b'*, after the same have been arranged over the ends of the slat *a'*, of the basket lid A'.

It will thus be seen that I have provided two novel, simple and efficient forms of basket lidding tools, both of which are well adapted for all of the purposes heretofore designated, and even though I have herein shown and described these forms of the invention as consisting of certain detail structural elements, it is nevertheless to be un-understood that some changes may be made therein, without affecting the spirit and scope of the appended claim.

Having thus described my invention, what I claim as new is:

In a basket lidding tool wherein the lid includes a cross slat whose ends extend beyond the edge of the lid, and wherein the basket is provided with the usual wire bails for engagement over the respective ends of the slat; a handle lever formed from a flat bar, the inner end thereof being bent downwardly and twisted to provide an attaching lug, a cross plate fixedly secured at its intermediate portion on said lug, the lower edge of the cross plate being sharpened for biting engagement with the slat to provide a fulcrum for said lever, a plate like member increasing gradually in width toward its lower edge, a pair of spaced ears formed on the upper end of the plate like member for disposition on the hand lever, a pivot pin extending through the spaced ears and said lever, the lower edge of the plate like member bent to form a bail engaging hook, said hook being disposed between the sides of the bail and engaging the ground portion thereof for bending the same over in engagement with the adjacent end of the slat when the outer end of the lever is swung upwardly, said cross plate simultaneously forcing the lid downwardly.

In testimony whereof I affix my signature.

GLENN E. MISSMAN.